United States Patent [19]
Bellars

[11] Patent Number: 4,709,736
[45] Date of Patent: Dec. 1, 1987

[54] TRACTOR MOUNTED ROTARY CUTTING EQUIPMENT

[76] Inventor: Terence G. Bellars, P.O. Box 1442 Pietermaritzburg, Natal Province, South Africa

[21] Appl. No.: 837,643

[22] Filed: Mar. 5, 1986

Related U.S. Application Data

[63] Continuation of Ser. No. 728,305, Apr. 29, 1985, abandoned, which is a continuation-in-part of Ser. No. 573,338, Jan. 24, 1984, abandoned.

[51] Int. Cl.$^4$ ............................................. A01G 23/06
[52] U.S. Cl. ..................................... 144/2 N; 30/379; 51/170 R; 60/468; 299/91; 180/53.2; 180/53.4
[58] Field of Search .................. 60/494, 468; 180/53.4, 180/53.2, 53.7; 51/170 R; 30/379, 379.5; 173/22; 299/91, 93, 89, 55; 144/2 N, 193 A

[56] References Cited

U.S. PATENT DOCUMENTS

| | | | |
|---|---|---|---|
| 3,419,976 | 1/1969 | Reising | 299/91 |
| 3,732,905 | 5/1973 | Pickel | 144/2 N |
| 3,785,705 | 1/1974 | Binger et al. | 30/379 |
| 4,373,864 | 2/1983 | Massey et al. | 60/468 |

FOREIGN PATENT DOCUMENTS 244777 6/1947 Switzerland ..................... 144/193 A Primary Examiner—W. D. Bray
Attorney, Agent, or Firm—Finnegan, Henderson, Farabow, Garrett & Dunner

[57] ABSTRACT

Tractor mounted rotary cutting equipment of a type suitable for use in grinding down tree stumps to below surface level is provided. The cutting disc of the equipment is driven by an hydraulic motor through a flexible coupling and the hydraulic motor is, in turn, driven by an hydraulic power pack which is activated by the engine of the tractor. Preferably an over-run device is embodied to allow the cutting disc to continue rotating when the tractor engine is slowed down. The cutting disc preferably has cutters secured thereto by bolts or the like passing through a part of the disc and into co-operating screw threaded holes in the cutters.

11 Claims, 7 Drawing Figures

TRACTOR MOUNTED ROTARY CUTTING EQUIPMENT

RELATED APPLICATION

This application is a continuation of application Ser. No. 728,305, filed Apr. 29, 1985 and now abandoned, which is a continuation-in-part of application Ser. No. 573,338, filed Jan. 24, 1984 and now abandoned.

FIELD OF THE INVENTION

This invention relates to tractor mounted rotary cutting equipment such as saws for felling trees or the like and which are generally rotatable in a substantially horizontal plane and, more particularly, but not exclusively, vertically mounted cutting discs which are widely used for grinding or sub-dividing the upper region of stumps down to a predetermined depth in order to render them harmless to tractors subsequently used to plough lands from which trees have been cleared.

BACKGROUND OF THE INVENTION

Where lands are to be cleared of trees, the trees are firstly felled and then the stumps have to be treated in order to render them harmless to machinery subsequently used to treat the soil, such as ploughs, harrows and the like.

One device which has been employed for this purpose physically pulls the tree stump out of the ground by brute force. Apart from being extremely costly, such equipment has a tendency to create great cavities and unevenness in the land which requires that it must be treated to level it somewhat before a conventional tractor driven plough or the like can be passed over the land. Also, the stumps must still be removed or alternatively destroyed.

Accordingly a device has been available and is operating at the present time, wherein a substantially vertically orientated cutting or grinding disc or drum is mounted on a swivel arrangement on a tractor such that it can be swung to and fro over a stump to comminute it down to a suitable depth, for example 25 cm to 30 cm below the ground surface. The depth is chosen such that the stump is rendered harmless to tractors and other soil working implements which may be passed over the land.

In one currently available simple stump treating machine of this nature described in U.S. Pat. No. 3,732,905 (to Pickel) the cutting disc is mechanically driven directly from the conventional power take off of the tractor by means of Vee-belts. This means that articulation of the frame supporting the cutting or grinding disc is difficult, and restraints are placed on the position where flexible joints can be located.

In such an arrangement the cutting or grinding discs generally consumes at least a substantial proportion of the power output of the tractor's engine and, accordingly, the tractor cannot be driven whilst the cutting or grinding disc is in operation. This means that the disc must be allowed to slow down sufficiently after a stump has been treated at the substantial speed at which it rotates in operation, in order that the power take-off can be disengaged, and the tractor moved to another position in order to treat another stump. Clearly the slowing down and speeding up of the cutting or grinding disc takes an appreciable amount of time thereby consuming fuel and useful working life of the tractor and cutting or grinding disc assembly.

U.S. Pat. No. 3,198,224 to Hiley proposes an arrangement which avoids the disadvantage by employing an hydraulic motor which drives the cutting or grinding disc through a Vee-belt or drive chain. The whole drive and disc arrangement is carried at one end of a foldable boom connected to a tractor or other suitable vehicle. Such an arrangement is costly and unsuitable for application to a general purpose tractor or the like.

A further disadvantage of presently used cutting or grinding disc arrangements is that the discs themselves have cutting tip carriers to which the tips are usually affixed by brazing, attached thereto by means of bolts wherein the carriers have plain holes therein through which the bolts pass. Thus, if, as is not uncommon, a bolt shears off, the entire cutting disc is rendered inoperative whilst the stub of the bolt is removed. Such removal is also often not a simple matter.

It is the object of this invention to provide rotary tractor mounted cutting equipment in which the disadvantages described above, as applied to tree stump cutting or grinding assemblies, are decreased, at least to some extent.

SUMMARY OF THE INVENTION

In accordance with one aspect of this invention there is provided rotary cutting equipment mounted on a tractor and comprising an hydraulic power pack coupled to be driven by the engine thereof, a cutter assembly comprising a rearwardly extending frame attached to, and supported by, the tractor through a mounting member at one end thereof and having a transverse rotatable drive shaft adapted for receiving a cutting disc thereon at the other end of the frame the driveshaft being operatively coupled directly to an hydraulic motor adapted to be powered by said power pack such that the axis of the hydraulic motor and that of the drive shaft at least intersect, the mounting member providing pivots for enabling both lateral angular slewing of the frame to take place as well as up and down angular movement thereof, and means for effecting such angular movements of the frame.

Further features of the invention provide for the mounting member to be attached through laterally transverse pivots to brackets mounted on the axle of the tractor to provide for said upward and downward movement of the frame; for the mounting member to be attached to the frame of the cutter assembly through an upwardly extending pivot thereby providing for said lateral angular slewing of the frame; for the frame to be connected to an anchorage point on the tractor through an hydraulic piston and cylinder assembly positioned to effect said slewing of the frame relative to the tractor; for further hydraulic piston and cylinder assemblies to be provided for effecting said upward and downward movement of the frame about the laterally transverse pivots whereby the mounting member is attached to the axle mounted brackets in use; for the rotatable shaft to be coupled co-axially to the hydraulic motor through at least one flexible coupling; and for the drive arrangement to include over-run means whereby the cutting disc can continue rotating under its own momentum whilst the hydraulic pump or power pack is slowed down or stopped by reason of slowing down or stopping the tractor engine.

Preferably the over-run feature is provided by a one way valve enabling the hydraulic fluid to recirculate through the motor in the over-run mode.

In order to provide a compact and easy-to-instal unit, the power pack is preferably embodied in the frame which takes the form of a hollow beam. The hydraulic pump is thus preferably located in the hollow beam such that it can be coupled, by way of a drive shaft and universal joints, to the usual power take-off of an agricultural tractor provided at the rear of such tractor. The hollow beam itself conveniently defines the reservoir for the hydraulic fluid and any fluid filter for the system is preferably located outside of the beam for service convenience.

A second aspect of this invention provides a cutting disc of the type comprising a rotatable support disc to which are attached a plurality of cutters each of which comprises a carrier having secured thereto, such as by brazing, one or more hard wearing cutting inserts, such as of tungsten carbide, the cutting disc being characterised in that bolts or other screw threaded fasteners are employed for securing the cutters to the disc and each such bolt or fastener passes through an unthreaded or oversized hole in the disc into screw threaded holes in suitable cutters whereby they are attached to the cutting disc.

Further features of this aspect of the invention provide for the cutting disc to have carriers mounted both on each side of the cutting disc as well as on the periphery thereof and, in the case of the carriers mounted on the periphery, for the disc to be provided either with suitable cut out regions to enable bolts to be introduced in a radially outwardly extending position to co-operate with the screw threaded holes in the carriers or with peripheral zones which are directed outwardly at an incline and which are perforated to receive bolts passing therethrough. In the case of carriers or cutters on the side surfaces of the disc they are preferably located opposite each other with bolts having counter sunk heads passing through one carrier or cutter, through the disc, and into a screw threaded hole in the opposite carrier or cutter.

Clearly it is the intention of this invention that the individual parts of the rotary cutting disc equipment be covered by the invention. That is to say that the frame assembly is intended to be covered as separately from the hydraulic power pack where same is not embodied in the frame itself and both are covered separately from a supporting tractor. Similarly a cutting disc constructed according to this invention in intended to fall within the scope thereof whenever sold separately and apart from the frame assembly.

In order that the invention may be more fully understood one embodiment thereof will now be described as applied to a cutting or grinding disc assembly designed for the sub-dividing of the upper end of a tree stump or the like.

DESCRIPTION OF THE DRAWINGS

In the following description reference will be made to the accompanying drawings in which.

DETAILED DESCRIPTION WITH REFERENCE TO THE DRAWINGS

Figure 1:
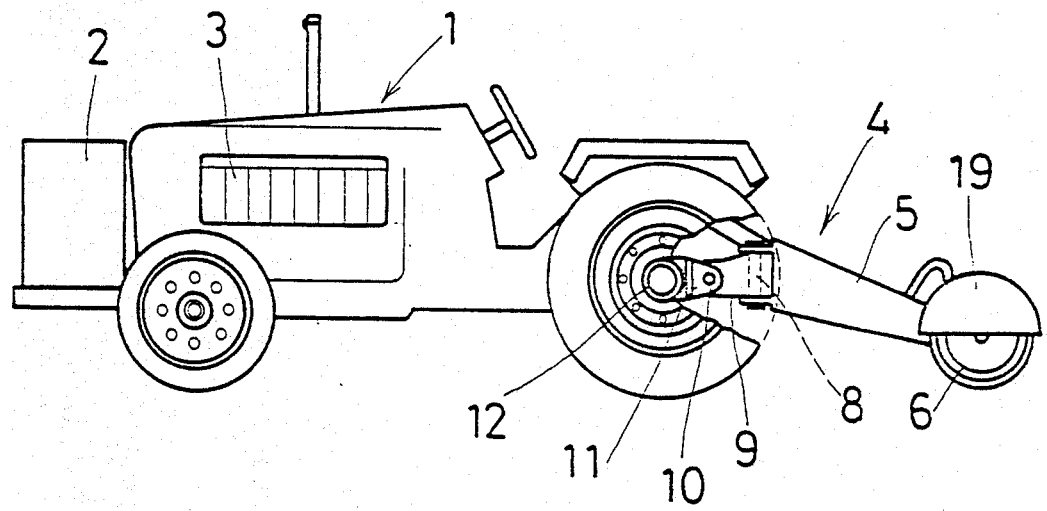
FIG. 1 is a side elevation of a tractor having fitted thereto a separate power pack and cutter or grinding disc assembly according to the invention.
Figure 2:
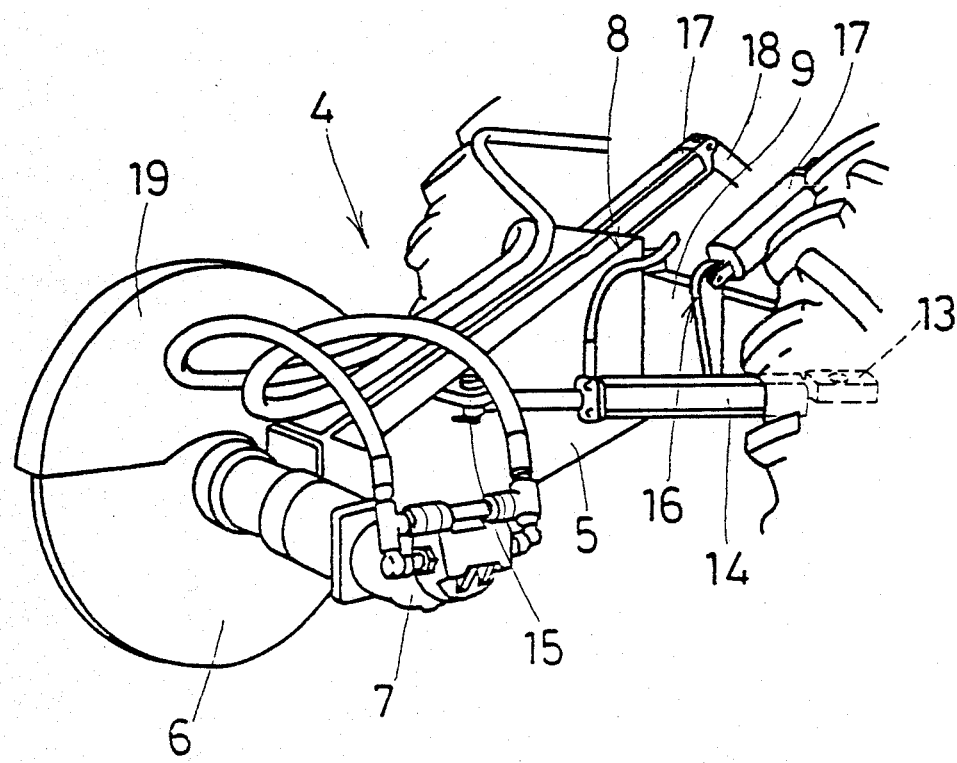
FIG. 2 is an isometric view of the cutter assembly from the rear of the opposite side from FIG. 1.
Figure 3:
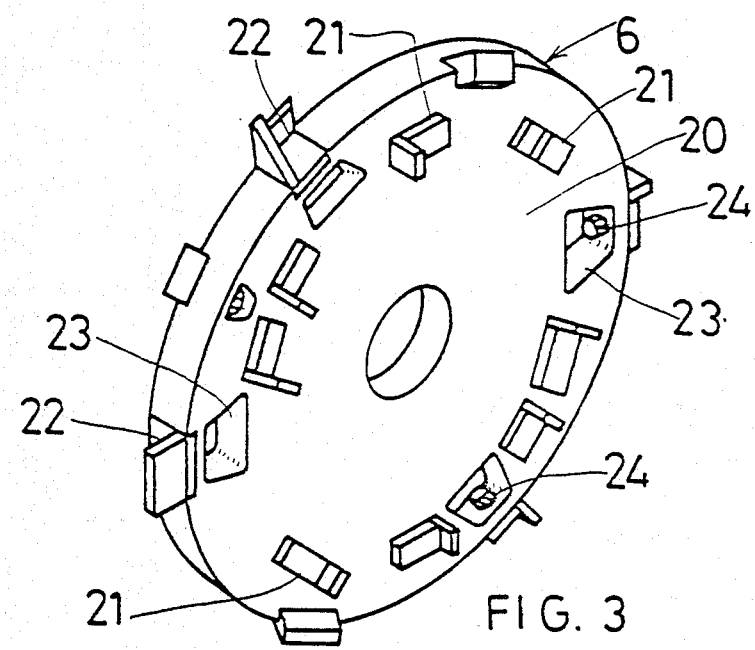
FIG. 3 is an isometric view of one form of cutting disc made according to the invention.

In the embodiment of the invention illustrated in FIGS. 1 and 2 a tractor 1 has an hydraulic power pack 2 mounted to the front end thereof and operatively coupled to the engine 3 of the tractor so as to be driven thereby. The hydraulic power pack will, in practice, generally require the major portion of the power output of the engine and thus the tractor cannot be driven and used to energise the power pack under load simultaneously.

The power pack may be disengagable physically from the drive of the engine. However, and preferably, the power pack is unloaded for the purpose of driving the tractor by opening a simple shut-off valve between the pressure and return lines. Controls of this nature are known and need not be further described herein.

Mounted to the rear end of the tractor is a cutting disc assembly generally indicated by a numeral 4 and comprising a frame 5 extending rearwardly from the tractor and supporting at its free end a transversely mounted rotatable shaft on one end of which is mounted a cutting disc 6. The cutting disc is located in a vertical plane in a horizontal position of the tractor. The other end of the shaft is to be driven by an hydraulic motor 7 operatively coupled to the hydraulic power pack to be driven thereby.

Figure 4:
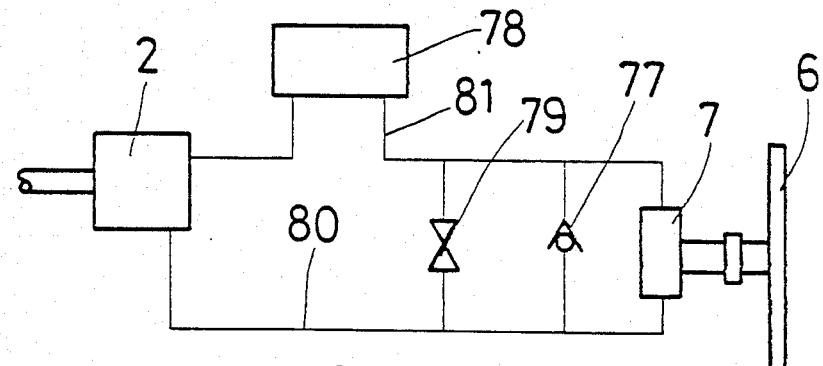
FIG. 4 is a schematic flow chart of the hydraulic circuit showing the over-run facility.
Figure 5:
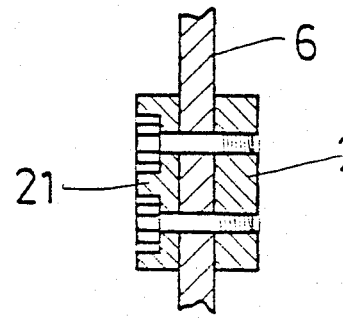
FIG. 5 illustrates in cross-section opposite cutters secured to a disc.

As indicated in FIG. 4, this over-run facility is provided by employing a one-way valve 77 connected to enable the motor to continue rotating as a result of fluid being able to recirculate when the tractor engine is slowed down or stopped. The hydraulic circuit includes a reservoir 78 in the usual way. Also, a shut-off valve 79 is connected between the high pressure side 80 and fluid return line 81 to effectively unload the engine whilst not disconnecting the power pack therefrom.

The frame is, in this case, of a boxed beam-like construction and embodies a vertical pivot 8 about which the frame can be laterally slewed to and fro in a horizontal plane. This pivot connects the frame to a mounting member 9 which is bifurcated to provide two anchorage positions at the two free ends which are spaced apart and which are pivoted, by means of collinear horizontal pivots 10, to brackets 11 bolted securely to the back axle 12 of the tractor. In this way the cutting disc assembly is stabilised by the entire tractor as opposed to the usual relatively flimsy lower hitch connection. The frame can thus pivot in a vertical plane about the pivots connecting it to the brackets on the tractor's back axle.

The mounting member has a connection point 13 for an hydraulic piston and cylinder assembly 14 to extend between 1 laterally offset position on one of its limbs and a co-operating anchorage formation 15 provided on one side of the frame. Thus the piston and cylinder assembly 14 connecting these two anchorage positions can be used to slew the cutting disc to and fro in a horizontal plane so as to move the cutting disc to and fro in a horizontal plane across the tree stump being treated.

The mounting member also has a pair of symmetrically arranged anchorage points 16 for the attachment of the appropriate ends of hydraulic piston and cylinder assemblies 17 thereto. The opposite ends of these piston and cylinder assemblies 17 are each connected to the upper end of the corresponding one of the conventional hydraulically movable tractor hitch connections. This pair of piston and cylinder assemblies 17 operates, in combination with the three point hitch assembly, to adjust the height of the cutting disc in use.

The piston and cylinder assemblies 17 interconnecting the hitch with the mounting member provide greater height adjustments for the cutting disc in use to ensure that the cutting disc can be lowered to a sufficiently low level, whilst also being able to be raised to initiate cutting or grinding at the top of a tree stump of a felled tree without the costly expedient of having a foldable boom.

The cutting disc is provided with the usual guard 19 for the protection of personnel in the vicinity of the cutting or grinding disc during operation thereof.

Once the cutting or grinding disc has attained the predetermined speed of rotation, it can, after suitably adjusting its height by means of the hydraulic piston and cylinder assemblies 17 connected to the tractor hitch, be moved to and fro by means of the hydraulic cylinder 14 controlling the slewing movement thereof. The tree stump can be ground or sub-divided in the usual size of steps with a predetermined height section of the stump being removed with each lateral pass of the cutting or grinding disc.

It will be understood that as a consequence of the hydraulic motor being mounted on the frame and coaxially with the cutting disc, there is absolutely no restriction on the movement of the frame in order to adjust the cutting disc to the required position. This is most advantageous when comparing the assembly of the present invention with the prior art Vee-belt driven cutting disc arrangement.

Once a tree stump has been comminuted down to a suitable level the hydraulic power pack is effectively disconnected from the motor by opening the shut-off valve 79 between the pressure and return lines whilst the cutting disc remains spinning at a high speed by reason of the presence of the over-run device described above. The tractor can then immediately be driven to a site where a further tree stump is to be treated, stopped in position, and the power pack again effectively connected to the power pack to drive the disc.

This almost entirely avoids the wastage of time experienced with prior art equipment of a similar nature but in which the cutting disc had to be substantially stopped and re-started each time the tractor was moved. The latter can actually damage the tractor.

Down time is also decreased in this case by employing a cutting disc according to this invention wherein the cutters comprise carriers to which the actual cutting inserts are attached and which are mounted on the sides and periphery of the disc 20 in a suitable configuration.

Figure 7:
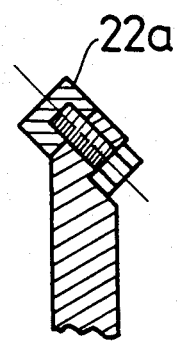

Carriers 21 mounted to the sides of the disc are secured thereto by means of bolts passing through plain holes provided in the disc and into screw threaded holes in, or a nut recessed into, one of a pair of oppositely located carriers. The other carrier of the pair accomodates, in counter sunk manner, the head of each bolt. In the case of the carriers 22 positioned at the periphery of the disc, these are likewise secured in position by bolts passing through plain holes in mounting regions adjacent to periphery of the disc and into screw threaded holes in the carriers. In this case, however, cut out regions 23 are provided in the disc in order to facilitate the installation of such bolts 24. Alternate carriers 22a may be mounted on surfaces directed at 45° to the plane of the disc in an outward direction as shown clearly in FIG. 7. As illustrated, this can be achieved without the aid of cut-out regions and simply by shaping the relevant zones of the disc at the periphery.

Should a bolt by which a carrier is secured to a disc become broken, no problems are experienced in removing the screw threaded portion from a screw threaded hole associated with the disc as any broken part of a bolt comes away with the carrier.

It will be understood that each carrier has hardened cutting inserts fixed thereto in the usual way such as by brazing, for example.

Numerous variations may be made to the above described embodiment of the invention without departing from the scope hereof.

In particular, the position of mount of the hydraulic power pack can be varied as may be required and according to a tractor's configuration. In particular, the power pack may be embodied in a unit together with the motor for mounting at the rear of a tractor.

Figure 6:
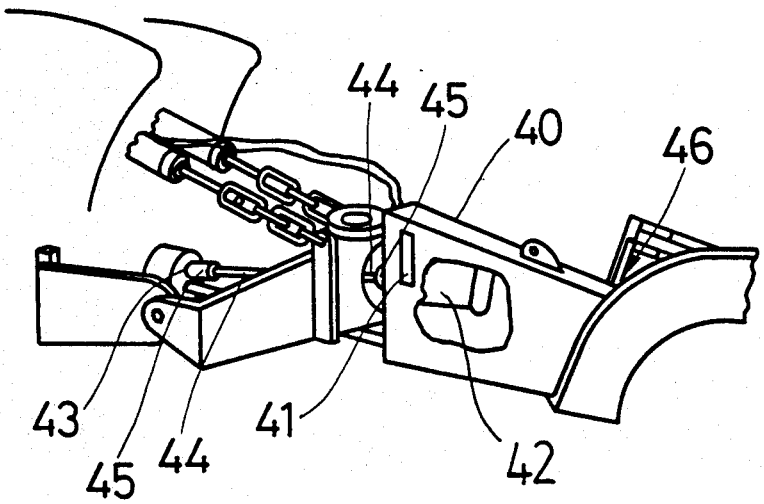
FIG. 6 illustrates in partly sectioned isometric view, an alternative form of cutter disc assembly in which the power pack is embodied in the frame of the cutter assembly, and, FIG. 7 illustrates, in view similar to FIG. 5, an alternative peripheral cutter attachment to cutter disc.

Such an arrangement is illustrated in FIG. 6 of the drawings. In this case the box-sectioned beam-like frame 40 forms the reservoir for hydraulic fluid and has a level indicator 41 on the outside thereof. The hydraulic pump 42 is located within this reservoir and is located to be driven by the conventional power take-off 43 of the tractor through a drive shaft 44 having universal joints 46 at each end thereof. In such a case any hydraulic fluid filter 46 in the hydraulic circuit is preferably located on the outside of the frame.

The exact pivotal arrangements for connecting the frame to the tractor, may moreover, be varied as may be required according to circumstances. It will be understood that it will be a simple matter to provide a drive either in addition to the driveshaft of the cutting disc, or as an alternative thereto, in which a driveshaft is provided to extend in a vertical direction and can have a circular saw blade attached thereto. Such an arrangement could be used for felling trees and, if it be a combination, it could subsequently be used for comminuting or grinding the stumps as above described.

The invention therefore provides a simple yet effective means for providing tractor mounted rotary cutting implements of the type described.

What I claim as new and desire to secure by Letters Patent is:

1. Rotary cutting equipment for mounting on a tractor having an engine, a power take off at the rear thereof, and a three point hitch assembly, the rotary cutting equipment comprising a hollow, rearwardly extending rigid beam attached to, and supported by, the tractor's three point hitch through a mounting member at one end of the beam, pivot means for pivotally connecting said beam to the tractor through said mounting member so that both lateral angular slewing of the beam can take place as well as up and down angular movement thereof, means for effecting such angular movements of the beam, a transverse rotatable drive shaft operatively receiving a cutting disc thereon mounted at the other end of the beam, a hydraulic pump operatively connected to the power take off and housed inside said beam, the hollow beam serving as well as a reservoir for hydraulic fluid for the pump, and a hydraulic motor mounted on the beam and powered by said pump, the drive shaft of the cutting disc being coupled directly to the hydraulic motor.

2. Rotary cutting equipment as claimed in claim 1 in which a hydraulic fluid filter is located on the outside of the beam.

3. Rotary cutting equipment as claimed in claim 1 in which the mounting member is attached to the beam by an upwardly extending pivot and to brackets carried by the tractor by laterally transverse pivots.

4. Rotary cutting equipment as claimed in claim 1 in which the beam is connected to a laterally offset anchorage point on the mounting member through an hydraulic piston and cylinder assembly positioned to effect slewing thereof about an upwardly extending pivot.

5. Rotary cutting equipment as claimed in claim 1 in which one or more hydraulic piston and cylinder assemblies are attached to the beam and anchorage points asosciated with the tractor are provided for effecting angular up and down movements of the beam.

6. Rotary cutting equipment as claimed in claim 1 in which means are provided for enabling the cutting disc to overrun the hydraulic motor.

7. Rotary cutting equipment as claimed in claim 6 in which said means comprises a one way valve for allowing free recirculation of hydraulic fluid through the hydraulic motor in the overrun mode.

8. Rotary cutting equipment as claimed in claim 1 in which the cutting disc drive shaft has a substantially horizontal orientation.

9. Rotary cutting equipment as claimed in claim 8, including a cutting disc carried on said drive shaft oriented in an upwardly extending plane and having peripheral cutters angularly spaced on its periphery and side cutters secured to its side faces.

10. Rotary cutting equipment as claimed in claim 9 in which threaded fasteners secure the cutters to the disc that extends through unthreaded holes in the disc and into complementary threaded holes in a cutter.

11. Rotary cutting equipment as claimed in claim 10 in which cutters are located in spaced positions on both side surfaces of the disc and bolts having countersunk heads extend through one cutter, through a hole in the disc and into a complementary threaded hole in the other cutter.

* * * * *